United States Patent Office 3,476,573
Patented Nov. 4, 1969

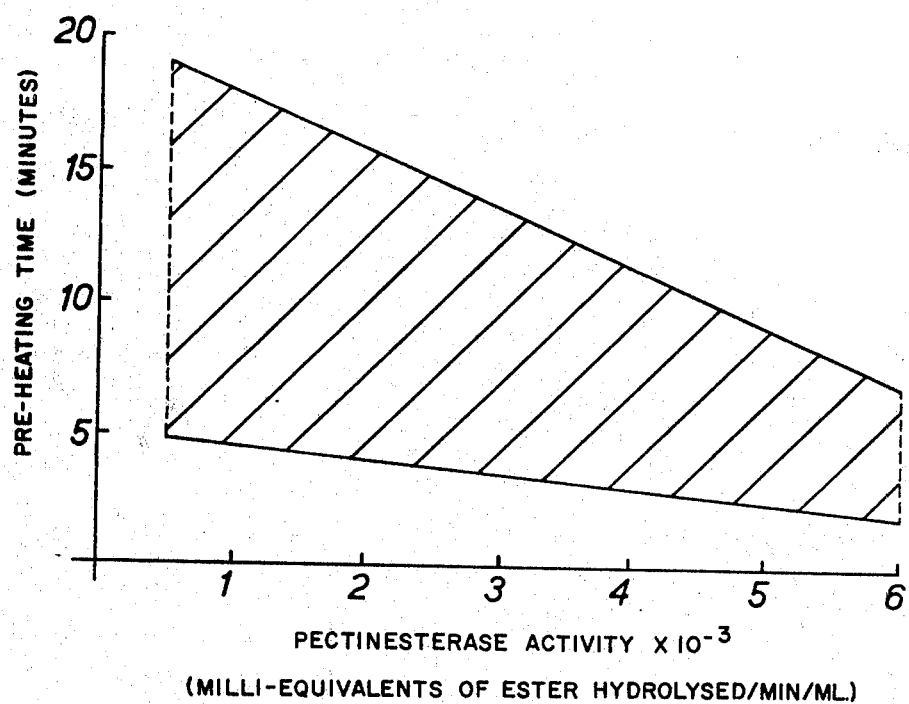

3,476,573
PROCESS FOR PRESERVING THE ORGANOLEPTIC PROPERTIES OF YOUNG POTATOES
Ralph Lester and Tegwyn Pierce Williams, Bedford, England, assignors to Lever Brothers Company, New York, N.Y., a corporation of Maine
Filed Apr. 12, 1966, Ser. No. 542,084
Claims priority, application Great Britain, Apr. 15, 1965, 16,258/65
Int. Cl. A23b 7/00
U.S. Cl. 99—193                                    1 Claim

ABSTRACT OF THE DISCLOSURE

The organoleptic properties of new potatoes are preserved by determining the pectinesterase activity of the potatoes, pre-heating them at a controlled temperature for a period of time dependent on their pectinesterase activity, partially blanching the potatoes to a center temperature not exceeding 65° C., and freezing the potatoes.

---

This invention relates to the treatment of vegetables and particularly to the treatment of potatoes.

Fresh vegetables may be preserved by blanching and quick freezing them. However, potatoes, especially new potatoes, when treated in this way, usually maintain a good colour and flavour, but tend to develop an open, loose texture which is very similar to that of old or mature potatoes. If on the other hand the blanching step is omitted, the waxy texture characteristic of new potatoes is preserved but the colour and flavour rapidly deteriorate during frozen storage.

The present invention provides a process for the treatment of new potatoes, which comprises subjecting the potatoes to a partial blanching treatment followed by a freezing treatment.

By "new potatoes" we mean young potatoes having a diameter not exceeding about 4 cm. and possessing the firm waxy texture well known in the trade.

By "partial blanching treatment" we mean a heat treatment which is of intensity sufficient to blanch only the outer portion of the potato. The intensity of this heat treatment is of course a function of time and temperature. Potatoes which have been exposed to a partial blanching treatment are themselves thus described as "partially blanched."

New potatoes may be partially blanched by exposing them to steam, water or other medium at about 100° C., suitably for between 10 and 90 seconds, and preferably for between 20 and 40 seconds. Use of a higher or lower blanching temperature will necessitate selection of a proportionally shorter or longer heating time respectively. In any case the potatoes should be not be heated during the partial blanching treatment at an intensity sufficient to raise the centre temperature of each potato above 65° C. and preferably not above 60° C.

Optionally the partial blanching treatment is preceded by a preheating treatment at a temperature below that used during blanching. The pre-heating is suitably carried out at a temperature between 40° and 65° C., preferably at about 50°–55° C. The duration of pre-heating preferably should not exceed 30 minutes, and it is generally sufficient to heat at the preferred temperature for not more than 15 minutes.

It is believed that the pre-heating treatment provides optimal conditions for the enzyme pectinesterase, which is naturally present in the potato, to strengthen the cellular structure of the tuber. The amount of this enzyme found in potatoes varies from variety to variety, and it is therefore desirable to assay the enzyme in order to determine the optimum pre-heating time for a particular variety. Determination of pectinesterase activity in the potato is described below, the optimum time for which the potatoes may be pre-heated can then be determined from the graph as shown in the accompanying figure.

Potatoes which may he been pre-heated are then partially blanched as previously described.

Determination of pectinesterase activity in the potato

Peeled potatoes (400 g.) are blended for one minute with M-sodium chloride (400 ml.) and the pH adjusted to 8 with sodium hydroxide. The blend is allowed to stand at room temperature for 6 hours in order to permit demethylation of the potato pectin, the pH being maintained at 8 by addition of alkali at suitable intervals. After standing over-night at 0° C. the supernatant solution containing the enzyme is separated from the potato pulp by centrifugation. The enzyme extract is stored under toluene at 0° C. until required. The enzyme activity of the potato extract is determined by titrating, with sodium hydroxide, the acid resulting from the action of pectinesterase on pectin.

In a typical experiment, 0.5% pectin, (100 ml.) was added to 2.5 M-sodium chloride (10 ml.) and buffered with 0.4 M-sodium acetate (5ml.) plus 0.4% sodium oxalate, (5 ml.). The mixture, at a temperature of 30° C., was adjusted to pH 7 and then the enzyme solution (10 ml.), also at pH 7, was added with continued stirring. The pH was maintained at 7 by autotitration with 0.05 M-sodium hydroxide and the enzyme activity calculated from the amount of sodium hydroxide consumed after 30 minutes, was expressed in terms of the number of milli-equivalents of ester hydrolysed/minute/ml. of enzyme extract.

The relationship between pectinesterase activity and optimum pre-heating time is shown in diagrammatic form in the accompanying figure; the ordinate represents the pre-heating time in minutes at 55° C. and the abscissa the pectinesterase activity $\times 10^{-3}$ in milli-equivalents ester hydrolysed/minute/ml. of enzyme extract. Having determined the pectinesterase activity on a small sample from a given batch or variety of new potatoes to be processed, the preferred pre-heating time for this pectinesterase activity will be within the limits of the shaded area corresponding to that activity. For example, if the pectinesterase activity of a given sample is determined as $3 \times 10^{-3}$ units, then reference to the graph will indicate that a pre-heating time from 3.5 to 13.5 minutes at 55° C. should optionally be chosen. Pre-heating at this temperature for less than or greater than the preferred time is likely, after frozen storage, to yield a product which is inferior to that which is prepared according to the preferred treatment.

The following examples are included to illustrate the invention.

Example 1

2.5 kg. of new potatoes of the variety Arran Consul of diameter between 2.5 cm. and 4 cm. were scrubbed to remove the skin and then partially blanched with live steam for 30 seconds, quick frozen and stored at −20° C. Samples of the same batch of potato were fully blanched for 10 minutes, frozen and stored at −20° C. Further samples of the same batch were stored without any pre-treatment, while some were cooked and immediately assessed by an expert taste panel to give control scores for comparison with the stored samples, which were assessed by the same panel after 6 months.

The potatoes that had been partially blanched before freezing were preferred to the fully blanched frozen samples.

Example 2

The pectinesterase activity of new potatoes of the variety Arran Consul was determined according to the above procedure and found to be $6.0 \times 10^{-3}$ pectinesterase units/ml. Reference to the figure showed that a pre-heating time of 2 to 7 minutes at 55° C. was most suitable.

2.5 kg. of new potatoes of this variety of diameter between 2.5 and 4 cm. were scrubbed to remove the skin and then pre-heated in a water bath thermostatically controlled to $55 \pm 1°$ C. and held at that temperature for 5 minutes. The potatoes were then removed from the water bath, partially blanched with live steam for 30 seconds, quick frozen and stored at $-20°$ C. Samples of the same batch of potato which had not been pre-heated were fully blanched for 10 minutes, frozen and stored at $-20°$ C. Further samples of the same batch were stored without any pre-treatment while some were cooked and immediately assessed by an expert taste panel to give control scores for comparison with the stored samples, which were assessed by the same panel after 6 months.

The potatoes that had been given a pre-heat and a partial blanch before freezing were preferred to the fully blanched frozen samples.

Example 3

The procedure of Example 2 was repeated except that the potato variety was King Edward and that the pretreatment was for 10 minutes at 55° C., since the pectinesterase activity was calculated as $2.0 \times 10^{-3}$ units/ml.

Taste panel preferences were the same as those from Example 2.

What is claimed is:

1. A process for preserving the organoleptic properties of new potatoes which comprises:

determining the pectinesterase activity of the potatoes, pre-heating the potatoes at a temperature of about 55° C. for a period of time dependent on their pectinesterase activity, said pre-heating time for a low pectinesterase activity of $0.5 \times 10^{-3}$ units being from about 5 to about 20 minutes, and for a high pectinesterase activity of $6 \times 10^{-3}$ units from about 2 to about 8 minutes, the range of pre-heating times for intermediate pectinesterase activities being proportionally intermediate between the limits defined as appropriate for the high and low pectinesterase activities, partially blanching the potatoes at about 100° C. for from 10 to 90 seconds, and subsequently freezing the potatoes.

References Cited

UNITED STATES PATENTS

| | | | |
|---|---|---|---|
| 2,597,065 | 5/1952 | Chase | 99—193 |
| 2,905,594 | 9/1959 | Morris | 99—193 X |
| 3,175,914 | 3/1965 | Vahlsing | 99—193 X |
| 3,355,299 | 11/1967 | McLaughlin et al. | 99—100 |

FOREIGN PATENTS

| | | |
|---|---|---|
| 657,676 | 9/1951 | Great Britain. |

OTHER REFERENCES

Talburt et al.: Potato Processing, Avi Publication Co., Westport, Conn., 1959, pp. 177, 178, 288–292.

LIONEL M. SHAPIRO, Primary Examiner

D. M. NAPP, Assistant Examiner

U.S. Cl. X.R.

99—103, 154